United States Patent [19]

Nash et al.

[11] 4,008,373
[45] Feb. 15, 1977

[54] DIGITAL DIFFERENTIAL PHASE SHIFT KEYED MODULATOR

[75] Inventors: Harold Garth Nash, Tempe, Ariz.; Gene Arnold Schriber, Austin, Tex.; John Robert Linford, Broomfield, Colo.

[73] Assignee: Motorola, Inc., Chicago, Ill.

[22] Filed: Oct. 3, 1975

[21] Appl. No.: 619,439

[52] U.S. Cl. .................................. 178/67; 325/163
[51] Int. Cl.² ....................................... H04L 27/18
[58] Field of Search ............ 178/66 R, 67; 325/30, 325/38 R, 163; 332/16, 9

[56] References Cited

UNITED STATES PATENTS

| | | | |
|---|---|---|---|
| 3,611,143 | 10/1971 | Van Gerwen | 178/67 X |
| 3,818,135 | 6/1974 | Tannhauser | 178/67 |
| 3,891,959 | 6/1975 | Tsuji et al. | 325/30 |
| 3,924,186 | 12/1975 | Gordy et al. | 178/67 X |
| 3,935,386 | 1/1976 | Glasson et al. | 178/67 |

*Primary Examiner*—Benedict V. Safourek
*Attorney, Agent, or Firm*—Anthony J. Sarli, Jr.

[57] ABSTRACT

A digital control circuit means responsive to a timing signal and a phase shift control signal accepts digital dibits of data and generates a digital control output signal. A digital phase shifter coupled to the control circuit and responsive to a timing signal generates a main and a secondary channel digital output signal alternately at a first and a second output terminal during successive dibit intervals. The main channel digital output signal is phase shifted a predetermined amount with respect to a main channel digital output signal generated during a preceding dibit interval in response to said digital control output signal. A multiplexer coupled to the first and second output terminals of the phase shifter transmits the main channel digital output signal on a third output terminal and the secondary channel digital output signal on a fourth output terminal. A digital number generator coupled to the third and fourth output terminals and responsive to a timing signal generates a series of digital output signals representative of a predetermined analog magnitude. A digital to analog converter converts the digital output signals from the digital number generator into a differential phase shift keyed analog output signal.

9 Claims, 8 Drawing Figures

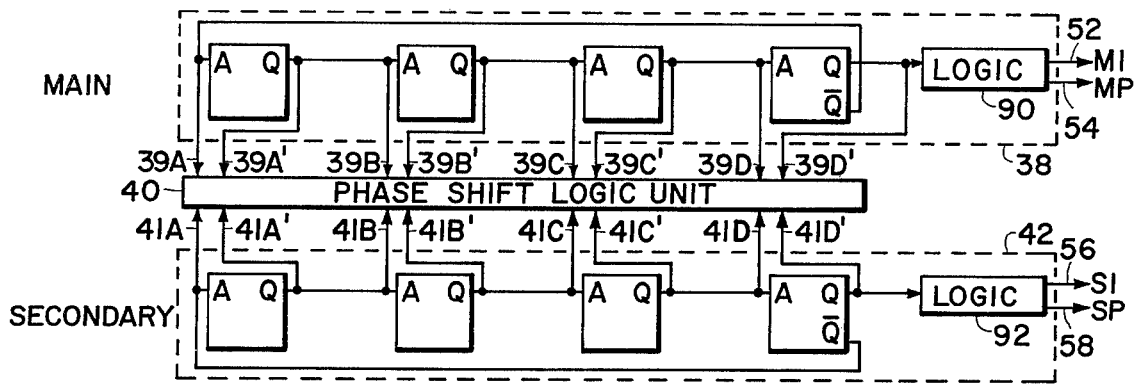
FIG. 2
| PHASE SHIFT | | |
|---|---|---|
| DIBIT | US | CCITT |
| 00 | 45° | 0° |
| 01 | 135° | 90° |
| 11 | 225° | 180° |
| 10 | 315° | 270° |
FIG. 3a
| STATE | REGISTER CONTENT | RELATIVE PHASE ANGLE | |
|---|---|---|---|
| 0. | 0 0 0 0 | RS0= 0° | $\overline{RS0}$=180° |
| 1. | 1 0 0 0 | RS1= 45° | $\overline{RS1}$=225° |
| 2. | 1 1 0 0 | RS2= 90° | $\overline{RS2}$=270° |
| 3. | 1 1 1 0 | RS3= 135° | $\overline{RS3}$=315° |
| 4. | 1 1 1 1 | RS4= 180° | |
| 5. | 0 1 1 1 | RS5= 225° | |
| 6. | 0 0 1 1 | RS6= 270° | |
| 7. | 0 0 0 1 | RS7= 315° | |
FIG. 3b
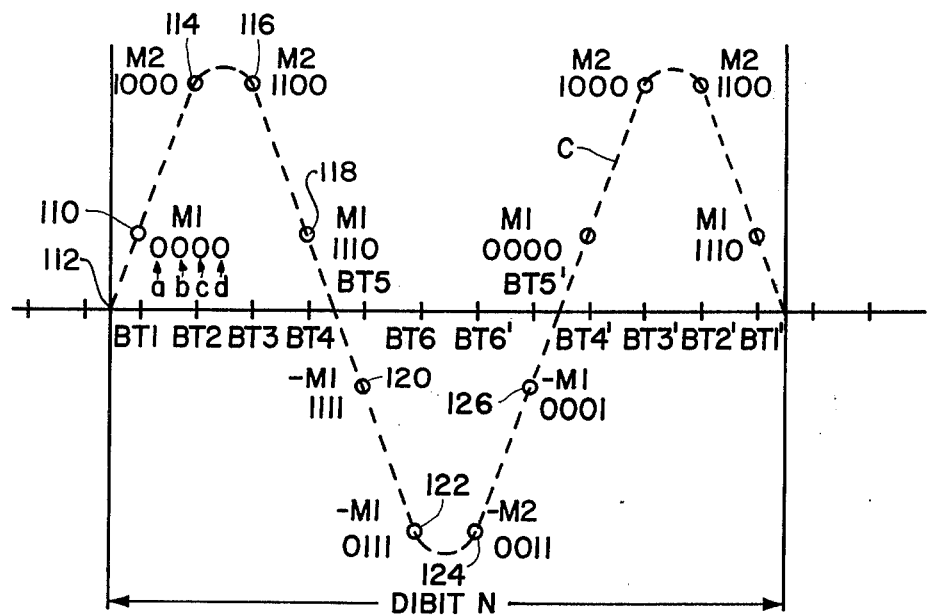
FIG. 4

DIGITAL DIFFERENTIAL PHASE SHIFT KEYED MODULATOR

BACKGROUND OF THE INVENTION

This invention relates to differential phase shift keyed modulators, and more particularly, to digital differential phase shift keyed modulators which use differential phase shift modulation to encode a binary data input such that the encoded signal can be transmitted over telephone lines.

Prior art differential phase shift keyed (DPSK) modulators, such as Bell System Data Sets 201A and 201B, operate at a fixed data input rate and are compatible only with the U.S. system of phase shift modulation. These prior art devices require amplitude modulators, low pass filters and summing amplifiers which utilize linear circuitry. Due to the presence of these linear circuit elements the prior art modulators require adjustment and calibration. Additionally, since these prior art devices are not totally digital they cannot be constructed on a single large scale integrated circuit chip.

The present inventive device is constructed using only digital circuitry enabling the entire apparatus to be constructed on a single large scale integrated circuit chip. Since the circuit is entirely digital, adjustments and calibration are not required. The system as constructed is fully compatible with either the U.S. phase shift encoding convention or the European (CCITT) phase shift encoding convention. The present system additionally is capable of operating at either of two input data rates which can be selected at will. Where prior art devices required linear amplitude modulators, low pass filters and summing amplifiers, the present invention performs all three of these tasks with a single read only memory (ROM) and associated circuitry.

SUMMARY OF THE INVENTION

It is an object of this invention to provide an all digital DPSK modulator capable of construction on a single integrated circuit chip.

It is another object of this invention to provide a digital DPSK modulator requiring no adjustment and no calibration.

It is still another object of this invention to provide a digital DPSK modulator capable of operating with either a half or full speed binary data input rate.

It is a further object of this invention to provide a digital DPSK modulator whose operation is compatible with both the U.S. and CCITT phase shift encoding conventions.

Briefly stated, and in accord with one embodiment of the invention, a digital differential phase shift keyed modulation system is provided for encoding a digital data input signal. This system includes control circuit means responsive to a timing signal and a plurality of operating parameter selection inputs for accepting the digital data input signal in dibits and for controlling the operation of a phase shifter means in response to the input signal; a phase shifter means coupled to the control circuit means and responsive to a timing signal for generating a main and a secondary channel output signal alternately at a first and a second output terminal means during successive dibit intervals, such that the main channel output signal is phase shifted a predetermined amount with respect to the main channel output signal generated during a preceding dibit interval in response to the control circuit means output signal; multiplier means coupled to the first and second output terminal means of the phase shifter means for transmitting the main channel output signal on a third output terminal means and the secondary channel output signal on a fourth output terminal means; binary number generator means coupled to the third and fourth output terminal means and responsive to a timing signal for generating a series of binary output signals, each having a predetermined magnitude; digital to analog converter means for converting the binary output signals from the binary number generator means into an analog output signal.

BRIEF DESCRIPTION OF THE DRAWINGS

FIG. 2 is an expanded block diagram representation of the phase shifter circuitry.

FIG. 3a is a table showing the relationship of the possible dibit input data combinations to the corresponding phase shifts for both the United States and European phase shift conventions.

FIG. 3b is a table showing the relationship between shift register content and the relative phase angle between two consecutive dibits.

FIG. 4 is a graph of an 1800 Hertz carrier wave one dibit in length without amplitude modulation.

DETAILED DESCRIPTION OF THE INVENTION

Figure 1:
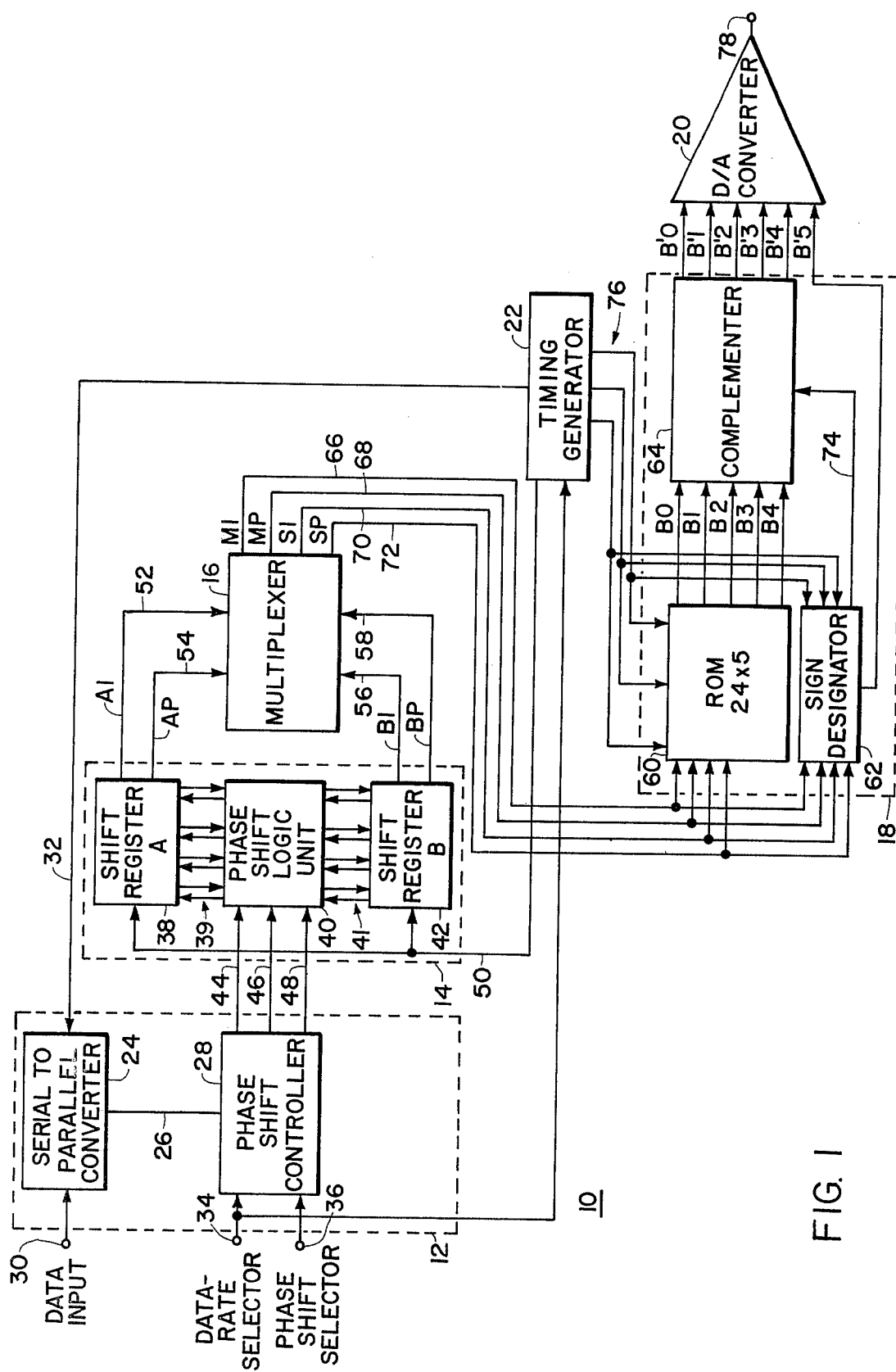
FIG. 1 is a generalized block diagram showing a hardware embodiment of the invention system.

In order to better illustrate the advantages of the invention and its contributions to the art a preferred hardware embodiment of the invention will now be described in some detail. The overall operation of the invention will first be described with reference to FIG. 1. DPSK modulator 10 includes a control circuit 12, a phase shifter 14, a multiplexer 16, a binary (or digital) number generator 18, a digital to analog (D/A) converter 20 and a timing generator 22. Control circuit 12 contains a serial to parallel converter 24 which is coupled by means of output conductor 26 to phase shift controller 28. Serial to parallel converter 24 receives a binary data input signal at input conductor 30 and a timing signal from timing generator 22 by means of output conductor 32. Phase shift controller 28 receives a data rate selector input at control conductor 34 and a phase shift selector input at control conductor 36.

The data rate selector input is also coupled to timing generator 22 by control conductor 34. Phase shifter 14 contains shift register A (designated by reference number 38), phase shift logic unit 40 and shift register B (designated by reference number 42). The output of phase shift controller 28 is coupled to phase shift logic unit 40 by means of output conductors 44, 46 and 48. A 14.4 kilohertz clock signal from timing generator 22 is coupled to shift register A and shift register B by conductor 50.

Shift register A is coupled to phase shift logic unit 40 by four paired input and output conductors shown at 39. Shift register B is coupled to phase shift logic unit 40 by four paired input and output conductors shown at 41. The output of shift register A is coupled to multiplexer 16 by output conductors 52 and 54. The output of shift register B is coupled to multiplexer 16 by output conductors 56 and 58.

Binary number generator 18 is composed of Read Only Memory (ROM) 60, sign designator 62 and complementer 64. The output of multiplexer 16 is coupled to ROM 60 and sign designator 62 by a plurality of output conductors 66, 68, 70, and 72. The output of ROM 60 is coupled to complementer 64 by a plurality of outputs B0, B1, B2, B3, and B4. The output of sign designator 62 is coupled to complementor 64 by output conductor 74. A separate output of timing generator 22 is coupled to an input of ROM 60 and to an input of sign designator 62 by a plurality of output conductors 76. The output of complementer 64 is coupled to D/A converter 20 by means of output conductors B'0, B'1, B'2, B'3, and B'4. The output of sign designator 62 is coupled to D/A converter 20 by output conductor B'5. The output of DPSK modulator 10 is obtained at output conductor 78.

Digital DPSK transmitter 10 is designed to transmit binary data at a fixed rate over a telephone line. A transmission rate of either 1200 or 2400 bits per second can be selected by data rate selector input 34. The incoming data is encoded on a carrier wave as a succession of signal element phase shifts, each of which is an odd multiple of 45° in the U.S. convention (i.e., the phase may be shifted one, three, five, or seven times 45°) with respect to the previous signal element phase or an even multiple of 45° by the CCITT convention (i.e., the phase may be shifted 0, 2, 4, or 6 times 45°), with respect to the previous signal element phase. These combinations are shown in FIG. 3a.

In order to encode by means of these four phase shifts the serial data is received by the serial to parallel converter 24 through data input conductor 30. Serial to parallel converter 24 receives the incoming binary data in a serial manner and groups the incoming binary data into pairs of binary bits called "dibits". These dibits of data are fed to phase shift controller 28 by output conductor 26. The serial input data at data input conductor 30 has now been converted into a parallel dibit form of data.

Since there are four possible dibit combinations or codes (i.e., 00, 01, 11, 10), each of the four phase shifts can be associated with one of the dibit codes. FIG. 3a shows the association of each dibit code with the four phase shifts corresponding to the U.S. system and the four phase shifts corresponding to the CCITT system. The phase of the carrier associated with a particular dibit is shifted by some predetermined amount with respect to the phase of the carrier just transmitted during the previous dibit. This is to be contrasted with phase modulation systems where the phase shift is made with respect to a fixed phase reference signal. The present scheme make it unnecessary to transmit absolute phase information. Phase shift selector 36 selects either the U.S. or the CCITT phase shift convention.

System operation will be described assuming that the data rate selector 34 is set for operation at an input rate of 2400 bits per second and phase shift selector 36 is set for operation under the U.S. phase shift convention. The slower data input rate would normally be used only for operation in a noisy environment to reduce noise induced errors.

The DPSK modulator 10 generates an encoded signal by sequentially phase shifting two 1800 Hertz carrier waves with respect to each other. Modulator 10 has two separate sources of carrier: shift register A and shift register B. Shift register A generates a channel A output signal and shift register B generates a channel B output signal. These channels alternate in supplying the line signal, with the transfer from one channel to another taking place gradually once each dibit. The signal from channel A will be the main channel for one dibit, channel B the next, and so on. During the time channel A is supplying the main channel signal its phase is held constant, and it is during this time that the phase of channel B (which is now the secondary channel) is changed to the value that it will have during the next dibit interval.

The necessary phase changes are made at a time when the channel being changed is not supplying the line signal. There are transition periods at the beginning and end of each dibit where the output of the secondary channel is being phased out while the output of the main channel is being phased in. The gradual transition is produced by an amplitude modulation signal which has a frequency of 400 Hertz. The amplitude modulation signal is provided to reduce the contribution from the two summed signals during this transition region since abrupt phase changes occur during this time which generate frequency spectrums falling outside the desired range. The amplitude modulation provides a much smoother and more acceptable output waveform during this transition period.

Timing generator output 32 operates at either a 1200 or 2400 Hertz rate to synchronize the operation of serial to parallel converter 24 with the data arriving at input 30 so that the incoming data can be properly grouped into dibits.

Timing generator output 50 is clocked at a rate of 14.4 kilohertz. Dibits of data are received at a rate of 1200 Hertz. Since the frequency of the carrier is 1800 Hertz there are one and a half carrier cycles per dibit interval.

Referring now to FIG. 4, a dibit interval N is shown during which carrier wave C generates one and a half cycles. Timing generator output 50 operating at a rate of 14.4 kilohertz divides this dibit interval into twelve subintervals (or dibits) defined as bit time 1 (BT1) through BT6 and BT6' through BT1'. One clock pulse occurs every 45 degrees of carrier phase shift.

FIG. 4 shows an 1800 Hertz carrier C without amplitude modulation having a phase angle of 0 degrees. During the total length of dibit N which is composed of twelve separate time intervals BT1 through BT6 and BT6' through BT1', 1.5 cycles of the carrier wave C are generated. A system has been designed such that this sinusoidal carrier wave C can be represented by two magnitudes, M1 and M2. A four bit binary word is used to encode these two magnitudes, the phase angle, and the polarity of carrier C during each bit time.

During dibit N as shown in FIG. 4, reference number 110 shows the first point at which the magnitude, polarity, and phase angle of the carrier wave C is encoded into the special binary format. A different sampling and encoding process occurs each 45° of carrier. This corresponds to the beginning of each bit time interval. The phase difference between BT1 which is sampled at reference point 110 and BT2 which is sampled at reference point 114 is 45°. The phase difference between the beginning of dibit N shown at reference point 112 and the first sample of the carrier wave C which occurs at reference point 110 is only 22½ degrees. This initial sample is taken after only a 22½ degree phase shift (one half of a bit time interval) so that a carrier wave could be represented by only two magnitude levels. If the first sample had coincided with the beginning of a particular bit time interval it would have been necessary to use three magnitude levels to represent the carrier wave. In that case, a magnitude corresponding to the zero level, an intermediate level and the peak level would have been required. The use of the 22½ degree initial phase shift allowed a simplified representation with only two distinct magnitude levels, M1 and M2.

The four bit binary word representative of the magnitude, polarity and phase angle of each sample of the carrier wave C corresponds to the state of each shift register--shift register A and shift register B. FIG. 3b shows how a shift register which has an initial all-zero content shifts during each clock pulse from state zero through state seven. This provides a total of eight states which are required to represent the eight possible phase shifts which correspond to four possible incoming dibit combinations for both the U.S. convention and the CCIT convention. The right side of FIG. 3a shows each of the eight possible combinations of phase shifts. In FIG. 4 since the phase angle of the carrier wave C shown is zero degrees, the initial sample point shown at reference 110 (represented by the binary word 0000) corresponds to a counter state 0 shown on the left-hand side of FIG. 3b.

From FIG. 4 it can be seen that the second state shown at reference 114 has a binary word corresponding to the phase angle of the carrier wave which corresponds to state 1 of FIG. 3b. Proceding on through each point represented on the carrier wave C shown in FIG. 4, there is a direct correspondence between each consecutive point and each counter state shown in the left-hand side of FIG. 3b. In this manner all four bits of each binary word serve to encode carrier wave phase angles.

Another coding system based on this same four bit binary word is used to represent the polarity and magnitude of each sample of the carrier wave C. In FIG. 4 the binary word of the sample taken at reference point 110 has four binary bits represented by letters $a$, $b$, $c$ and $d$ as shown. The fourth bit of this binary word, bit $d$, not only assists in representing the phase angle but also is entirely determinative of the polarity of each sample. The binary word 0000 which designates to the relative phase angle of the sample at reference point 110 has a binary zero in position $d$. Whenever the binary character in position $d$ is zero, the associated sample amplitude will have a positive polarity. This can be seen by referring to reference points 114, 116 and 118 where the binary bit in position $d$ is zero. This corresponds to a positive sample polarity. The polarity of the sample shown at reference points 120, 122, 124 and 126 has a binary one in position $d$ of the binary word. This is the convention which has been chosen to represent a negative sample polarity. Whenever the binary bit in position $d$ of any of these four bit binary words is a 0, the polarity of the magnitude is positive and whenever the binary bit in position $d$ of each four bit binary word is a 1, the corresponding polarity of the magnitude sample is negative.

By comparing any two four bit binary words it can easily be determined how much phase shift there is between the two words chosen. For instance, referring in FIG. 4 to the binary word associated with the sample shown at reference point 110 (0000) and the binary word associated with the sample shown at reference point 116 (1100) the relative phase shift between these two sample points can readily be determined. Referring to FIG. 3b, it can be seen that a binary word 0000 corresponds to state 0, while the binary word 1100 corresponds to state 2. Since the phase shift between each state is 45°, it can be seen that the phase shift between state 0 and state 2 is a total of 90°. Therefore the phase shift between reference point 110 and reference point 116 is 90°.

A further feature of the four bit binary word generated by shift registers A and B is that whenever the first three positions of the binary word, that is, positions $a$, $b$, and $c$, are the same (i.e., $a = b = c$) the magnitude of that sample is equal to an M1 magnitude. For instance, at reference point 110 positions $a$, $b$, and $c$ of the four bit binary word are all zeros. Therefore the sample magnitude has an M1 magnitude. The same is true at reference point 118 where positions $a$, $b$ and $c$ all contain a binary 1 so that the sample has an M1 magnitude. At reference point 122 the content of positions $a$, $b$, and $c$ is a 011. Since these binary bits are not identical the magnitude associated with that binary word is an M2 magnitude.

By decoding this four bit binary word each of which corresponds to a particular sample of the carrier wave C the magnitude and polarity of that particular sample can be determined. The relative phase shift between that sample and any subsequent sample can also be determined by comparing the counter state to which that four bit binary word corresponds with a second counter state associated with a second binary word since the phase shift between each consecutive state is always 45°.

The counters which actually implement this code are referred to in FIG. 1 as shift register A and shift register B. A more detailed diagram of shift registers A and B is depicted in FIG. 2. During any given dibit interval one of these shift registers will be producing the main channel output while the other shift register is producing a secondary channel output. If shift register A is generating a main channel output during one dibit interval, it will generate a secondary channel output during the succeeding dibit interval. FIG. 2 depicts a dibit interval during which counter 38 is producing the main channel output while counter 42 is producing the secondary channel output. Each counter is composed of four flip-flops each having an input A and an output Q. The final flip-flop in the counter has an output Q which is fed back to the first counter's input A. If counter 38 begins in state zero shown in FIG. 3b with register content 0000, it will shift consecutively through states 0, 1, 2, 3, 4, 5, 6, 7 and then back to a 0 state again. Each of the counters is clocked at a 14.4 kilohertz rate which produces one shift in state during each bit time interval.

The output of the main counter 38 occurs at output conductors 52 and 54. A high level output from output conductor 52 corresponds to an M1 magnitude and a low level output on output conductor 52 corresponds to an M2 level magnitude. Since the magnitude output must either be an M1 or an M2 level, the absence of an M1 magnitude always corresponds to the presence of an M2 magnitude.

The output of output conductor 54 determines the polarity of the corresponding magnitude signal generated at output conductor 52. When output 54 is a high level output, the main channel polarity will be positive (represented by MP). When the output of output conductor 54 is a low level output, the polarity will be negative. The absence of a positive polarity means that the polarity must be negative.

The secondary channel counter 42 has outputs 56 and 58. Output 56 generates either a S1 or S2 (S refers to secondary channel) magnitude in the same way that output conductor 52 generates either an M1 or an M2 magnitude. In the same manner output conductor 58 generates an SP signal which corresponds to a secondary channel positive polarity signal. The absence of an SP output corresponds to a secondary channel negative polarity. An S1 magnitude corresponds exactly with an M1 magnitude. Each of these identical magnitudes is referred to by a different letter to distinguish between a main channel output and a secondary channel output. Since during each subsequent dibit interval the designation of counter 38 as the main channel and counter 42 as the secondary channel will alternate, output leads 52 and 54 will be generating an M1, MP output during one dibit interval and an S1, SP output during the next dibit interval.

Logic units 90 and 92 are contained within counters 38 and 42 respectively and serve to decode the four bit binary word coming from each of the counters into a magnitude output (M1, S1) and a polarity output (MP, SP) by using the technique described above of comparing the binary bits in positions $a$, $b$, $c$, and $d$ of each four bit binary word.

Let us assume that registers 38 and 42 shown in FIG. 2 both begin with register contents of 0000. They will both continue to run in perfect synchronization. The phase shift between the two at all times will be zero since the register content of each register 38 and 42 will always be identical during each bit time interval. The outputs M1, MP, and S1, SP will always be identical. Also referring to FIG. 3a, a zero phase shift would only correspond to a CCITT dibit input of 00. There is no zero phase shift condition which corresponds to any U.S. system dibit input condition.

As was mentioned above, this differential phase shift keyed transmitter operates by phase shifting a carrier wave generated during a dibit interval N+1 with respect to a previous carrier wave which had been generated during a dibit interval N. The system operates completely on *relative* phase shift angles. The absolute phase angle of each carrier wave is irrelevant.

Figure 5:
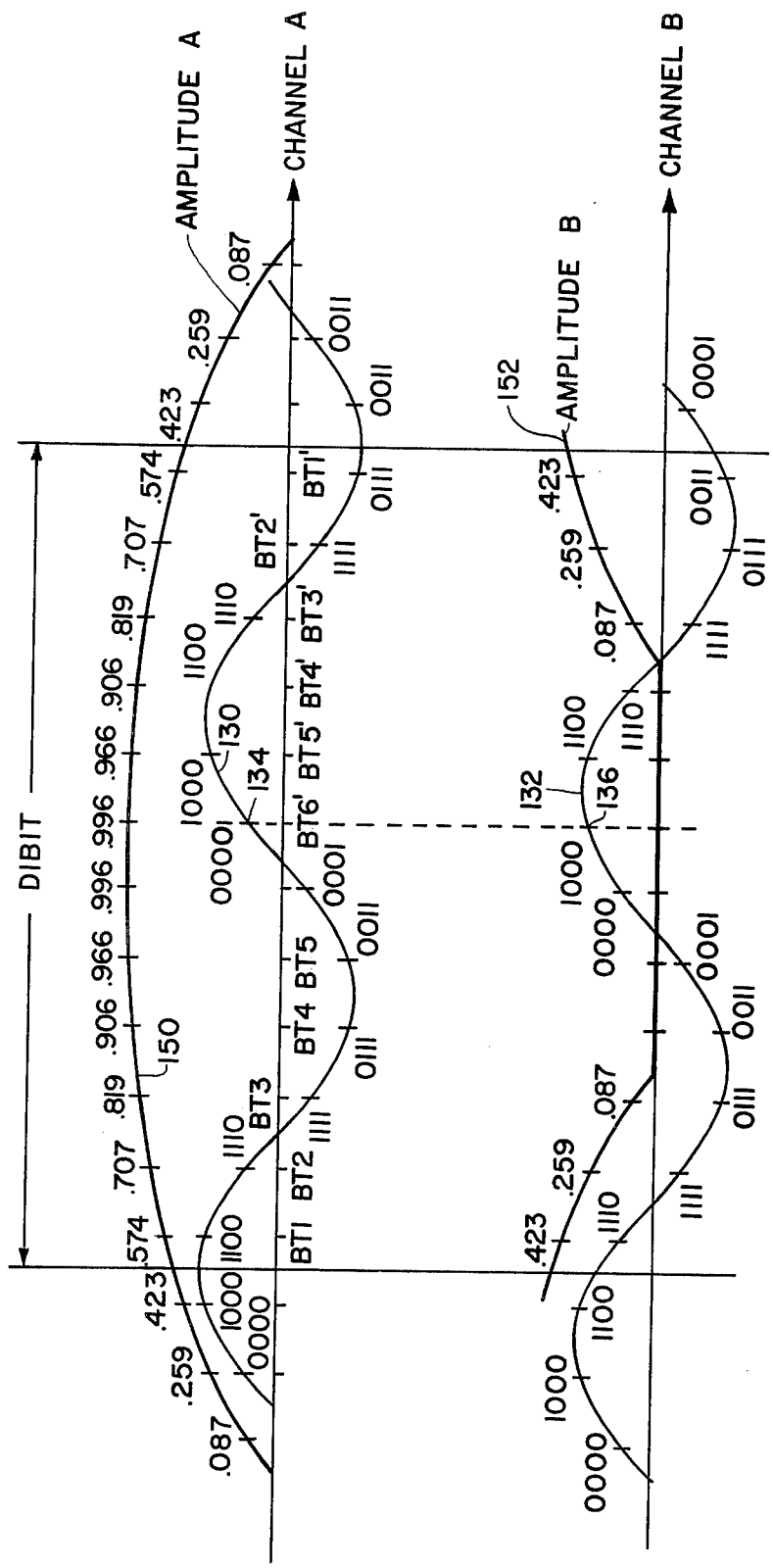
FIG. 5 is a graph showing a channel A carrier wave with its corresponding amplitude modulation signal and a channel B carrier wave with its corresponding amplitude modulation signal.

The example shown in FIG. 5 will be used to analyze how this differential phase shift keyed modulation is accomplished. Assume that the channel A carrier wave shown by reference numeral 130 is generated during one dibit interval and that the channel B carrier wave shown by reference numeral 132 is generated during the subsequent time interval. A differential phase shift of 45° exists between the reference. Channel A carrier wave 130 and the subsequent Channel B carrier wave 132. The relative phase shift is determined by examining the contents of shift registers A and B during the same bit time interval in each carrier wave. For convenience, in channel A reference point 134 shows a counter state 0000 during BT6'. The corresponding counter state existing in the channel B counter at BT6' is shown at position 136. Here the counter state is 1000. Referring now to FIG. 3b it can be seen that a channel A register content of 0000 corresponds to a 0 state, the channel B register content of 1000 corresponds to a 1 state. Remembering that the phase shift between each consecutive state is equivalent to 45° it can be seen that the relative phase shift between the channel A and channel B carriers is 45°.

The output of shift register A during BT6' will have an M1 magnitude and a positive polarity which corresponds to the encoded data in the four bit word 0000. The output of shift register B will be an M2 magnitude with a positive polarity again which corresponds to the encoded data in the 1000 four bit word.

Phase shift controller 28 shown in FIG. 1 operates to control the relative phase shift between the main and the secondary channel registers. Phase shift controller 28 observes the output of serial to parallel converter 24. Since we are dealing with a U.S. mode of operation for this particular example, it can be seen from FIG. 3a that a 00 dibit input was required to produce this 45° relative phase shift.

FIG. 3b shows the various register contents for each counter state. Since binary members shift through a register from left to right, a shift from any given state to the next subsequent state is referred to as a right shift 1 (RS1). As previously discussed, a RS1 is equivalent to a 45° relative phase shift. If the main register data content is a 1100 (corresponding to a state labeled state 2 in FIG. 3b) and the secondary register has a content of 0111 (corresponding to a state labeled state 5 in FIG. 3b) the relative shift between the two will be equivalent to a RS3, that is a shift from state 2 to state 5. This corresponds to a phase shift of 135°.

Assuming that the main channel register has a content of 0000 at a particular bit time, the right-hand side of FIG. 3b labeled "Relative Phase Angle" shows the relative phase shift and associated right shift number required to produce that amount of phase shift. For instance, a RS6 is required to produce a 270° relative phase shift, between the main and secondary channel counters. To simplify the encoding of this relative phase shift command which is transmitted by phase shift controller 28 to phase shift logic unit 40, a simplified system was adopted. To generate a RS7 which corresponds to a 315° phase shift and a register content of 0001 it was found that a RS3 command could be transmitted between the phase shift controller 28 and the phase shift logic unit 40 on conductors 44 and 46 and that a separate complement command could be transmitted on conductor 48. It can be seen that a state 3 register content of 1110 when complemented equals 0001. This 0001 corresponds to a RS7 or a 315° relative phase shift as desired. To generate a 180°, 225°, 270°, and a 315° relative phase shift, conductors 44 and 46 can transmit respectively an RS0, RS1, RS2 or RS3 command while conductor 48 would transmit a complement command. For a dibit input of 11 a $\overline{RS1}$, which corresponds to a U.S. phase shift of 225°, would be transmitted from the phase shift controller 28 to the phase shift logic unit 40.

Referring to FIG. 2 phase shift logic unit 40 is the apparatus which actually accomplishes the right shifts between shift registers. For a dibit interval during which register 38 is generating the main channel signal and register 42 is generating the secondary channel signal, phase shift logic unit 40 will receive a command at a designated time during this dibit interval from the phase shift controller 28 telling it the desired amount of right shift which should be accomplished between the main and secondary channel registers. Phase shift logic unit 40 at an appropriate time reads the outputs of the main channel register which are derived at output conductors 39A', 39B', 39C', and 39D'. Phase shift logic unit 40 right shifts this data the instructed amount of positions and complements them as commanded. The output of phase shift logic 40 then initializes the state of each flip-flop contained in secondary channel register 42. This initialization is accomplished through phase shift logic unit 40 output conductors 41A, 41B, 41C, and 41D. Assuming that this command from phase shift logic unit 40 to secondary channel register 42 is a command other than RS0 (which would have no effect on the operation of secondary channel register 42 since it would be operating in total synchronization with the main channel register 38), the content of secondary register 42 will be instantaneously altered so that it now begins to operate with a different phase angle with respect to the main register 38. From this initialization time until a time one dibit later, secondary channel shift register 42 will operate with a fixed phase angle relative to main register 38. At a designated point during each dibit the relative contents of each phase shift register can be altered as required by phase shift logic unit 40.

In FIG. 1 the output of shift register A at output conductor 52 generates an A1 signal while output conductor 54 generates an AP signal. Similarly shift register B output conductor 56 generates a B1 signal and output conductor 58 generates a BP signal. During one dibit interval shift register A may generate a M1, MP signal while during the subsequent dibit interval it will generate a S1, SP signal. Multiplexer 16 performs the function of taking the A1 and AP signals arriving on conductors 52 and 54 and the B1 and BP signals arriving on conductors 56 and 58 and switching the pair of signals coming from each shift register each dibit interval so that the output of multiplexer 16 on conductor 66 will always be the M1 signal. Multiplexer 16 also performs switching functions so that the output arriving at output conductor 68 will always be the MP signal, the output on conductor 70 will always be the S1 signal, and the output on conductor 72 will always be the SP signal. Each dibit multiplexer 16 switches the pair of inputs A1, AP and B1, BP so that the M1, MP and S1, SP outputs always occur on the same output conductors.

FIG. 5 shows the amplitude modulation signals which are to be multipled with the carrier waves corresponding to the channel A register output and the channel B register output. During the particular dibit interval shown in channel A is functioning as the main channel and channel B is functioning as the secondary channel. The amplitude modulation signal associated with the main channel carrier wave is designated by reference number 150. The amplitude modulation signal associated with the secondary channel carrier is shown by reference number 152. As was mentioned before, the purpose of the amplitude modulation is to reduce the transition region contribution when the main channel output and the secondary channel output are being summed together. This occurs during BT1-BT4 and during BT4'-BT1'. Were the amplitude modulation signal not present there would be some very abrupt magnitude and phase transitions between the main and secondary channel during the transition region which would create undesirable high order harmonic frequencies. The amplitude modulation greatly reduces the transition region contribution from both the main and secondary channels so that this undesirable frequency range output is minimized.

It can be seen that between BT4 through BT4' the secondary channel or channel B contribution is reduced to zero since the amplitude modulation signal with which the carrier wave 132 is multiplied equals zero. The product of the two signals is zero also. The transition region includes BT1 through BT4 and BT4' through BT1'. During these two transition intervals the main channel contribution is greater than zero and the second channel contribution is greater than zero. The amplitude modulation signal is symmetrical. At both BT2 and BT2' the amplitude modulation magnitude is equal to 0.259. Only nine values of the amplitude modulation signal must be used by the system and those are defined during BT1 through BT6.

The output signal which the DPSK modulator must synthesize is the sum of the amplitude modulated main and the secondary channel signals. This is accomplished in the present digital embodiment once each bit time interval by taking each main channel carrier wave sample amplitude (M1 signal) and polarity (MP signal) and multiplying it by the corresponding amplitude modulation component (which will always be positive) and adding the secondary channel carrier wave sample amplitude (S1 signal) and polarity (SP signal) and multiplying it by the corresponding amplitude modulation component. For each of the twelve bit time intervals there will be a corresponding sum signal. Since the amplitude modulation signal between BT1 and BT6 is symmetrical with that between BT6' through BT1', it was found that all possible sums signals associated with BT6' through BT1' were duplicated by sum signals occurring between BT1-BT6.

Mathematical equations indicated that there would be 60 different magnitudes for all possible combinations of each of these different amplitudes during the six possible bit times under consideration. It was found after carefully tabulating each of these 60 possible combinations that there was a substantial duplication of magnitudes. After these duplicate sets of magnitudes had been eliminated it was found then that there were 48 distinct values which remained. Upon further careful analysis it was discovered that of these 48 values, 24 were positive magnitudes which were identically matched with 24 negative magnitudes. Upon further careful analysis it was discovered that whenever the polarity of the main channel signal was positive that with only a single exception the total summation signal representative of the summed main and secondary channel signals was also positive. This sole exception occurred during BT1 when the main channel carrier had a M1 magnitude and a positive sign and the secondary channel carrier had a S2 magnitude and a negative sign.

These discoveries made possible the use of Read Only Memory (ROM) 60 of dimension 24 × 5. ROM 60 functions as a look-up table such that for a given combination of input signals ROM 60 is able to determine which of the 24 possible magnitudes should be selected. Sign designator 62 performs the function of determining whether each of the 24 possible magnitudes generated by ROM 60 has a positive polarity or a negative polarity.

Sign designator 62 determines the proper polarity of the ROM output signal generally by sensing the polarity of the MP signal which is available at output conductor 68 of multiplexer 16. Sign designator 62 must also determine if the one exception to this general polarity relationship is present. The polarity of the MP signal is determinative of the polarity of the ROM output signal except during BT1. A plurality of output conductors 76 from timing generator 22 transmit a timing signal corresponding to BT1 through BT6 to sign designator 62. When sign designator 62 senses te BT1 time interval it then compares the M1, MP, S1, and SP input signals which are transmitted to it via conductors 66, 68, 70, and 72. If sign designator 62 determines that during BT1 there is an M1 magnitude with a positive polarity and an S2 magnitude with a negative polarity, it will then generate a sign signal opposite that of the MP polarity.

As mentioned before ROM 60 functions as a look-up table. The plurality of output conductors 76 from the timing generator 22 allow ROM 60 to determine the bit time. Multiplexer 16 outputs M1, MP, S1 and SP are transmitted to ROM 60 by output conductors 66, 68, 70 and 72. The combination of timing signals and magnitude and polarity signals allow ROM 60 to determine which of the possible 24 magnitudes it should read out at its outputs B0, B1, B2, B3, and B4. In this manner the ROM 60 functions as a look-up table when given the appropriate set of input data. This arrangement is much cheaper and less complicated than the alternative of building a series of adders and multipliers to generate the desired one of the 60 possible output sum signals.

The ROM 60 has a capacity of 24 words each of which is five bits in length. The actual numerical value of the 24 absolute values which were required to be stored in the ROM vary between 0.0315 and 0.9204 in value. Since it was not possible to store magnitudes of such small value in the ROM as a five bit binary word directly these were quantized by multiplying each of them by 31 ($31=2^5-1$). This scaling results in quantized values of the 24 absolute values which vary between 0.97 and 28.53. Each of these quantized values was rounded off to the nearest whole binary number. For instance, the 0.97 magnitude was rounded off to a binary 1 (00001) and the 28.5 quantized value was rounded off to a binary 29 (11101). The output of ROM 60 is sent to a complementer 64 in the form of a five bit binary word having positions B0, B1, B2, B3, and B4. The maximum quantized value from ROM 60 would correspond to a binary 29 composed of a 11101 signal on lines B4, B3, B2, B1, and B0 respectively.

A sixth binary bit designated B'5 is generated by sign designator 62. A B'5 output of 0 corresponds to a negative sign for the one of the 24 possible absolute values produced by ROM 60, while a B'5 output of 1 corresponds to a positive sign for the absolute value. Sign designator 62 in addition to generating the B'5 sign signal also has an output 74 to a complementer 64. Whenever B'5 contains a 0 (negative) output signal, sign designator 62 via conductor 74 commands complementer 64 to complement the output of ROM 60 arriving at lines B0 through B4.

D/A converter 20 receives input signals on lines B'0 through B'5 and converts this six bit binary input signal into an analog output signal at output conductor 78. The output of D/A converter 120 is scaled to produce analog values having a value between 0 and 63.

Figure 6:
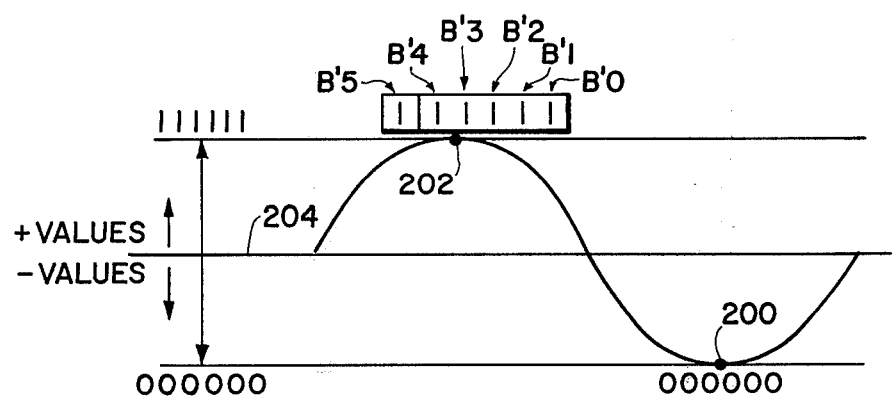
FIG. 6 is a graph showing the correspondence between the binary number generator output and the D/A converter output.

FIG. 6 shows the relationship of the binary inputs to the analog outputs of D/A converter 20. When D//A converter 20 receives an input signal on lines B'0-B'5 of 000000 it will produce an output corresponding to the location shown at reference number 200. If D/A converter 20 receives an input signal of 111111 it will produce an output signal corresponding to the location shown at reference number 202. The magnitude of the binary number shown at reference number 202 is equal to 63 while the magnitude of the binary number shown at reference point 200 is equal to zero. The letters above the number corresponding to the reference point 202 indicate that the first binary number occurs in position B'5. Position B'5 corresponds to the sign output of sign designator 62. At reference number 202 the 1 in position B'5 indicates that the output of ROM 60 is to have a positive polarity. The binary numbers in positions B'4 through B'0 indicate the absolute magnitude of the signal generated by ROM 60. In the case shown at reference number 202 the 11111 binary word shown in positions B'4 through B'0 indicates a mangitude of 31 and the binary 1 in the B'5 position indicates a positive polarity, therefore the value of the signal shown at reference number 202 is +31.

Reference line 204 in FIG. 6 corresponds to a zero value or zero reference level with respect to magnitudes generated by ROM 60. If values greater than zero are desired to be generated by the ROM 60 and sign designator 62, the D/A converter 20 must produce an output above line 204. If ROM 60 and sign designator 62 desire to generate a negative signal the D/A converter 20 must produce an output below line 204. This feature is best understood by observing the actual operation of the binary number generator circuit 18 when it is attempting to generate a negative number. Let us assume that binary number generator 18 has been instructed to generate a number having a value of −31. ROM 60 first generates a binary number having a magnitude equal to 31. Output lines B'0 through B'4 from ROM 60 must contain an output signal corresponding to 11111 which corresponds to a magnitude of 31. Sign generator 62 will have inputs which instruct it to assign a negative sign to the output of ROM 60. Sign designator 62 therefore provides a 0 binary bit at input B'5 to D/A converter 20 and also provides an output signal at 74 which instructs complementer 64 to complement the input signal arriving from ROM 60. Complementer 64 then takes the 11111 binary word arriving from ROM 60 complements it and produces an output signal at B'0 through B'4 equal to 00000. The actual binary input to D/A converter 20 is 000000. This corresponds to a value of −31. D/A converter 20 with this 000000 input will produce an output at reference number 200. Although this corresponds to an actual D/A converter output of zero, it also corresponds to a −31 magnitude with respect to zero reference line 204. The binary word corresponding to the value at reference number 200 is shown immediately below reference number 200 and the binary bit in position B'5 is shown as a binary 0 which indicates the presence of a negative number.

Any time the binary bit in position B'5 is a 0, D/A converter 20 will generate an output signal lying below 0 reference line 204. Any time a binary 1 occurs in position B'5 D/A converter 20 will generate a signal having a magnitude line above 0 reference line 204 and this will correspond to a positive magnitude.

In the preferred embodiment a low pass filter will be coupled to D/A converter output 78 since the output of D/A converter 20 will be in the form of a stepped output waveform which charges value during each subsequent bit time. The function of the low pass filter is to eliminate the high frequency components of the D/A converter 20 output signal and thus round the edges of this output signal to more closely approximate an actual smooth sinusoidal signal.

Figure 7:
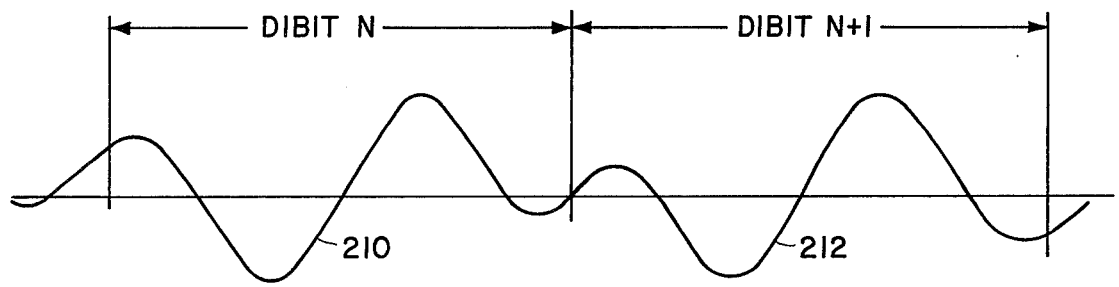
FIG. 7 is a graph showing a typical output signal waveform of the DPSK Modulator after passing through a low pass filter.

FIG. 7 shows an approximation to an actual signal which would be produced at the output of the filter following D/A converter 20 during dibit intervals N and N+1. The signal shown represents the summation of the main and secondary channel amplitude modulated signals and clearly shows the transition region where the output waveform changes its phase from one dibit to the next. The phase angle of the carrier at reference number 210 differs from that the reference number 212.

It will be apparent to those skilled in the art that the disclosed apparatus for generating a differential phase shift keyed signal for transmission through a communications medium line may be modified in numerous ways and may assume many embodiments other than the preferred forms specifically set out and described above. Accordingly, it is indeed by the appended claims to cover all such modifications of the invention which fall within the true spirit and scope of the invention.

What is claimed is:

1. A digital differential phase shift keyed modulation system for encoding digital dibits of data comprising:
   a. timing means for generating timing signals;
   b. digital control circuit means responsive to said timing signals and a phase shift control signal for accepting digital dibits of data and for generating a digital control output signal;
   c. digital phase shifter means coupled to said control circuit means and responsive to said timing signals for generating a main and a secondary channel digital output signal alternately at a first and a second output terminal means during successive dibit intervals, said main channel digital output signal being phase shifted a predetermined amount with respect to a main channel digital output signal generated during a preceding dibit interval in response to said digital control output signal;
   d. multiplexer means coupled to said first and second output terminal means of said phase shifter means for transmitting said main channel digital output signal on a third output terminal means and said secondary channel digital output signal on a fourth output terminal means;
   e. digital number generator means coupled to said third and fourth output terminal means and responsive to said timing signals for generating a series of digital output signals, each representative of a predetermined analog magnitude.

2. A digital differential phase shift keyed modulation system for encoding digital dibits of data according to claim 1 further including:
   a. digital to analog converter means for converting said digital output signals from said digital number generator into a differential phase shift keyed analog output signal.

3. A digital differential phase shift keyed modulation system for encoding digital dibits of data according to claim 1 wherein said digital control circuit means further includes:
   a. serial to parallel converter means responsive to said timing signals for converting serial digital data into dibits;
   b. phase shift controller means responsive to said phase shift control signal and said dibits for generating a phase shift command signal in response thereto.

4. A digital differential phase shift keyed modulation system for encoding digital dibits of data according to claim 3 wherein said digital phase shifter means further includes:
   a. said timing means including means for generating a plurality of bit time signals;
   b. first shift register means responsive to said bit time signals for generating first digital magnitude and polarity output signals at the first output terminal means;
   c. second shift register means responsive to said bit time signals for generating second digital magnitude and polarity output signals at the second output terminal means, wherein said first and second digital magnitude and polarity signals alternately constitute said main channel and said secondary channel digital output signals during successive dibit signals;
   d. phase shift logic means coupled to said first and second shift register means for selectively shifting contents thereof a predetermined amount in response to said phase shift command signal.

5. A digital differential phase shift keyed modulation system for encoding digital dibits of data according to claim 4 wherein said digital number generator means further includes:
   a. read only memory means coupled to said multiplexer means and responsive to said timing signals for generating digital signals representative of a differential phase shift keyed modulation signal;
   b. digital sign designator means responsive to said timing signals and coupled to said multiplexer means for generating a digital output signal representative of the polarity of said differential phase shift keyed modulation signal;
   c. digital complementer means responsive to said sign designator means for selectively complementing said digital signals representative of a differential phase shift keyed modulation signal.

6. A digital differential phase shift keyed modulation system for encoding digital dibits of data comprising:
   a. means for receiving serial digital data;
   b. first digital logic circuit means responsive to said received digital data for generating encoded digital signals representative of at least two carrier waves phase shifted a predetermined amount with respect to each other;
   c. second digital logic circuit means responsive to said encoded digital signals for arithmetically combining said encoded digital signals;
   d. said second digital logic circuit means comprising read only memory means for storing signal magnitude values representing said arithmetically combined encoded digital signals and responsive to said enclosed digital signals for generating a plurality of digital signals representative of a differential phase shift keyed output signal.

7. A digital differential phase shift keyed modulation system for encoding digital dibits of data according to claim 6 further including:

a. means for converting said plurality of digital signals representative of the differential phase shift keyed output signal to an analog differential phase shift keyed modulation signal.

8. A digital differential phase shift keyed modulation system for encoding digital dibits of data according to claim 7 further including:
   a. a communication line coupled to receive said analog differential phase shift keyed modulation signal.

9. A digital differential phase shift keyed modulation system for encoding digital dibits of data according to claim 6 further including:
   a. a semiconductor substrate, and
   b. said receiving means and said first and second digital logic circuit means disposed on said substrate.

* * * * *